United States Patent Office 2,819,408
Patented Jan. 7, 1958

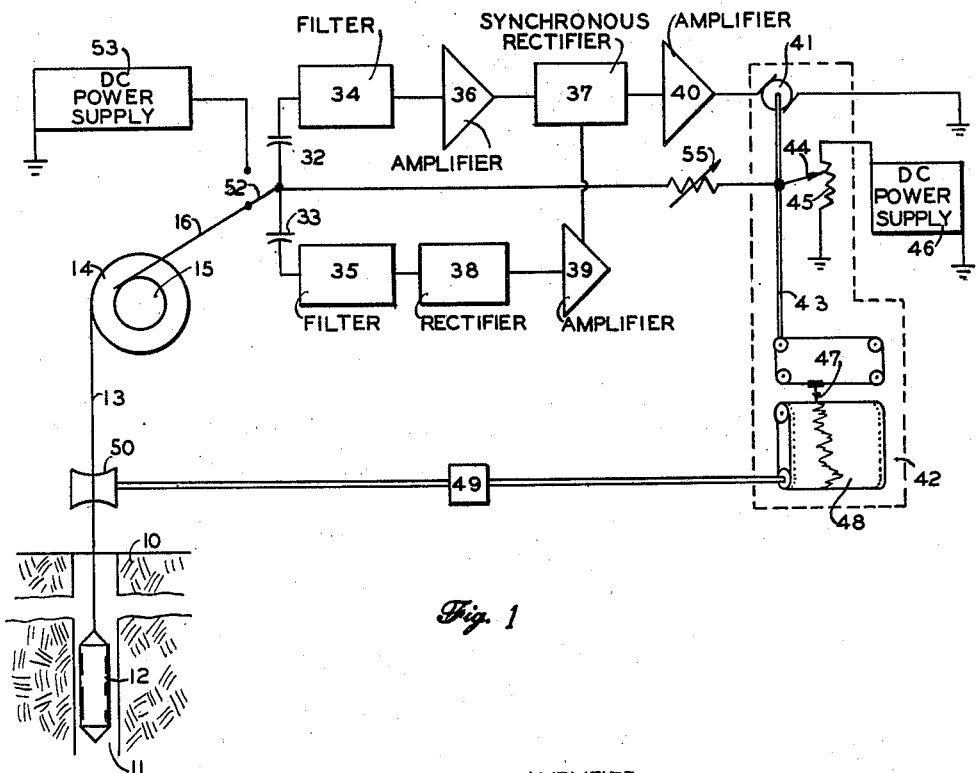
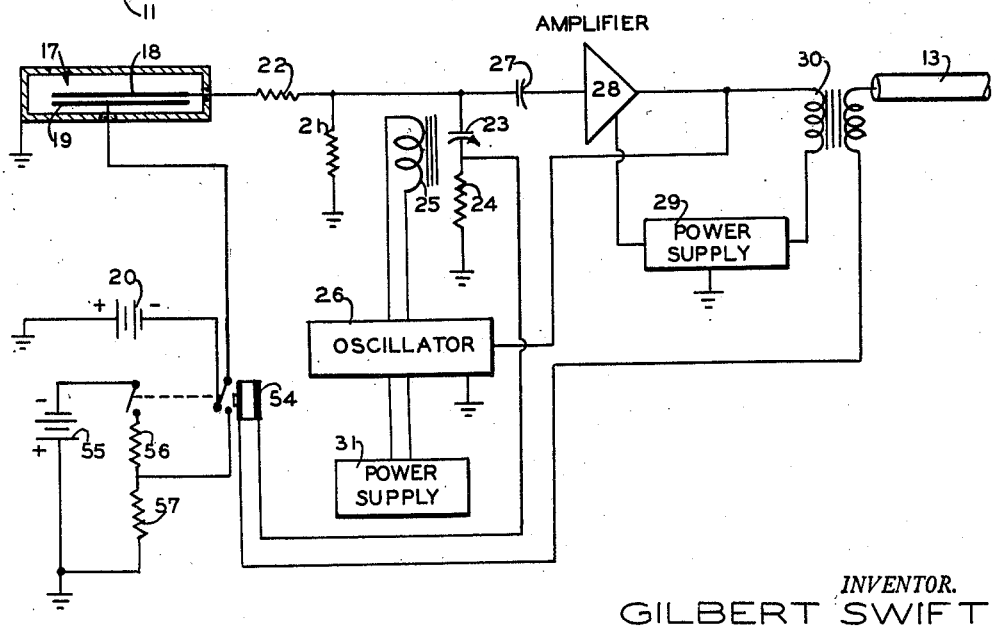
Fig. 1
Fig. 2
INVENTOR.
GILBERT SWIFT

2,819,408

INSTRUMENT ZEROING FOR RADIOACTIVITY WELL LOGGING

Gilbert Swift, Tulsa, Okla., assignor to Well Surveys, Incorporated, Tulsa, Okla., a corporation of Delaware Application December 4, 1952, Serial No. 324,106

10 Claims. (Cl. 250—83.6)

This invention relates to the art of geophysical prospecting and more particularly to a method and apparatus for measuring absolute values of radiation in a radioactivity well logging system while the radiation detector is disposed within the well at a point below the earth's surface.

In conventional radioactivity well logging, as practiced heretofore, logs are made with a continuous current detector, an ionization chamber, by measuring gamma radiation naturally emitted by formations surrounding a well or emitted from the formations following neutron bombardment. The ionization chamber output is applied to a vibrating-reed electrometer. The electrometer output is sent to the surface where a self-balancing potentiometer in a bridge arrangement develops a nulling current which is returned to the electrometer input. The potentiometer adjusts itself to balance the ionization chamber output and provide a net zero output from the electrometer. The balancing current is recorded on the surface as a measure of the ionization in the ionization chamber. In this system, absolute quantitative measurements are not possible, for the recorder position for zero incident radiation is not known. By use of the instant invention, it becomes possible to make radioactivity logs on a numbered scale with a zero reference; absolute radiation intensity can be compared from well to well or from point to point in a given well.

To determine the zero position, it is necessary to perform functions in a subsurface instrument which is relatively inaccessible at the end of a long cable. It is not possible to determine the zero position with the recorder alone, for the position of zero nulling current on the logging cable is not equivalent to zero radiation at the detector. This is because of contact difference of potential in the electrometer; the self-balancing bridge adjusts itself to send a current down the cable to balance contact difference of potential even with no radiation, and this is what must be recorded as the position of zero radiation.

There is no place in a normal well where the radiation is zero; however, were the radiation zero, the ionization chamber output would be zero, and this condition of zero output can be attained. In this invention, zero chamber output is attained by reducing the collecting field to zero so that ions are not removed from the chamber as they are produced by the ionizing radiation. This method of zeroing maintains all components in the circuit, hence no stray voltages are acquired or modified and the electrometer input impedance is the same during the zeroing operation as while logging. Were circuit components changed during the zeroing operation, the attained zero point would not necessarily be the true one.

Zero collecting field is not equivalent to applying no voltage between the collecting plates, for a contact difference of potential exists between the collecting plates. In this invention, a voltage is applied between the chamber electrodes to reduce the net voltage to zero. In order to use this method of ascertaining the point of zero radiation, it is necessary to predetermine what applied voltage is required to reduce the net voltage to zero. In application of the method, it is necessary to institute from the surface of the earth the application of this voltage to the chamber preferably over the same single conductor cable which transmits the electrometer signal and the nulling current. The determination of the proper voltage to apply is made on the surface of the earth before the subsurface instrument is completely assembled. A variable voltage is applied between the chamber electrodes and the radiation impinging upon the chamber is varied, as by moving a source of gamma rays close to the chamber and then moving it away. The variable voltage is adjusted so that a change in radiation has no appreciable effect upon the recorder. When a change in radiation has no effect, the ions in the ionization chamber are not being collected, which means no current and hence the chamber provides the same output as would zero radiation. This voltage is made permanently available in the subsurface instrument by a battery and voltage divider.

To apply this voltage between the chamber electrodes, a switch in the subsurface instrument is thrown by a signal from the surface. Since there is only one conductor, the relay used to close the switch must be insensitive to currents from the electrometer output or nulling current and must require a higher current. At the same time, the higher current cannot be supplied continuously from the surface, else it interferes with the signal and nulling current during zeroing. Therefore, a latching relay is used, one which changes position with a large current pulse and remains latched in this position until another large current pulse is transmitted from the surface of the earth.

This method of zeroing is inherently slow because of the long time required for the charge to leak off the chamber electrodes and for the system to reach equilibrium. For faster zeroing and where a change in the electrometer input impedance does not change the zero point, an alternative zeroing method comprises short-circuiting the chamber output. Since no laching relay is available which can be used at the chamber electrodes without affecting the high insulation and since the conductor carrying the electrometer output and nulling voltage must be kept out of the sensitive part of the system between chamber and electrometer, another relay is provided at the central chamber electrode. This relay is operated by a latching relay in turn operated from the surface.

The primary object of this invention is to provide a method and apparatus for measuring absolute values of radiation in a radioactivity well logging system. Another object is to provide means for determining the indication of zero radiation in a radioactivity well logging system. Other objects and advantages of the present invention will become apparent from the following detailed description, when considered with the accompanying drawings in which:

Figure 1 is a diagrammatic illustration of a geophysical well logging operation employing the apparatus of this invention;

Figure 2 is a diagrammatic illustration of one form of the subsurface instrument.

Figure 3:
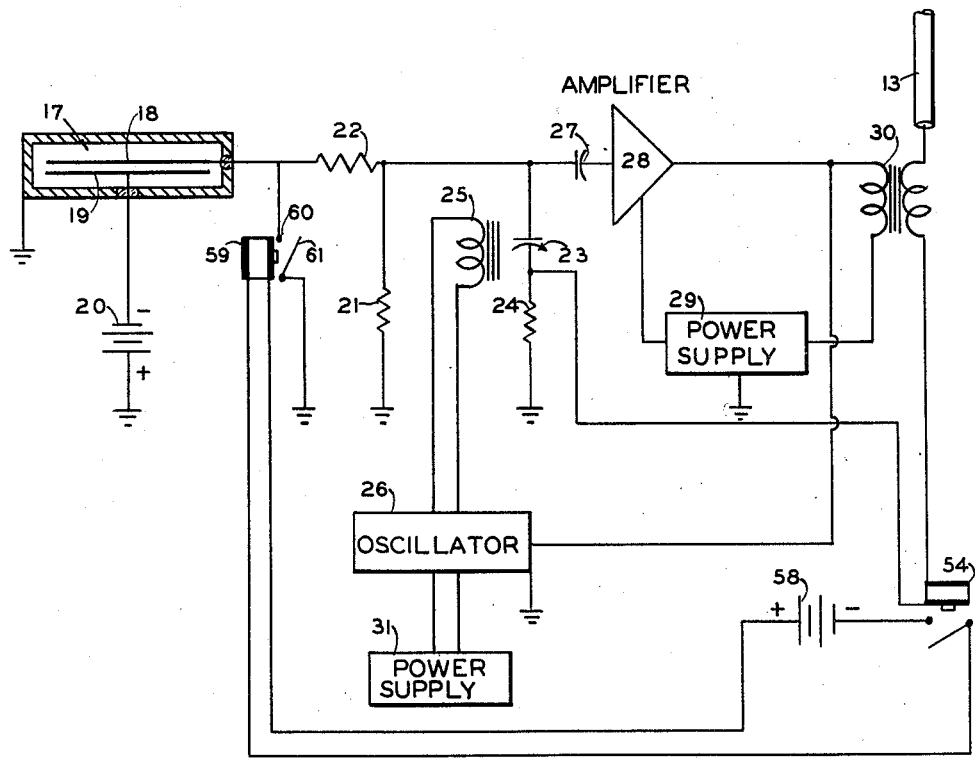
Figure 3 shows a modified form of the subsurface instrument.

Referring to the drawings in detail, particularly Figure 1, there is illustrated a well surveying operation in which the earth's surface 10 is shown in vertical section. A well 11 penetrates the earth's surface and may or may not be cased. Disposed within the well is a subsurface instrument 12 of the well logging system. Cable 13 suspends the instrument 12 in the well and electrically connects the instrument with the surface apparatus. The cable is wound on or unwound from drum 14 in raising and lowering instrument 12 to traverse the well. Through slip ring 15 and brush 16 signals arising in the subsurface instrument are applied to the surface apparatus.

Subsurface instrument 12 shown in Figure 1 may comprise the equipment shown diagrammatically in Figure 2. Radiation naturally emitted by the formations surrounding well 11 or emitted from the formations following bombardment by a source of radiation disposed within the instrument 12 is detected by ionization chamber 17 filled with ionizable gas such as argon at high pressure. Voltage is applied to electrodes 18 and 19 by battery 20 through resistors 21 and 22. The radiations striking the chamber 17 produce ionization within chamber 17 proportional to the incident radiation. The collection of ions by the voltage between the chamber electrodes produces a current through resistor 21 proportional to the ionization and hence to the incident radiation. This produces a direct current voltage indicative of incident radiation. This direct current voltage is applied across the vibrating-reed condenser 23 and feed-back resistor 24 in series. Condenser 23 is caused to vibrate periodically by drive coil 25 driven by oscillator 26. This causes the capacitance of condenser 23 to change periodically and produce an alternating current voltage across condenser 23 proportional to the difference between the direct current voltage across resistor 21 and the direct current voltage across feed-back resistor 24. This alternating current signal is applied through condenser 27 to amplifier 28 which is supplied with power from power supply 29. The output of amplifier 28 is coupled to cable 13 by transformer 30 and sent to the surface through cable 13. Oscillator 26 is supplied with power by power supply 31. In addition to producing a periodic driving voltage, oscillator 26 produces with each driving pulse a phase-reference signal which is also applied to cable 13 through transformer 30. This phase-reference signal is a damped wave-train of frequency higher than that of the driving voltage.

At the surface, the signals are applied through condensers 32 and 33 to filters 34 and 35, respectively. Filter 34 passes the alternating current signal indicative of the voltage across condenser 23. This signal is amplified by amplifier 36 and applied to synchronous rectifier 37. Filter 35 passes the phase-reference signal. This signal is rectified by rectifier 38, amplified by amplifier 39 and applied to synchronous rectifier 37. The output of synchronous rectifier 37 is a direct current signal proportional to the voltage across condenser 23 and of polarity indicative of the polarity of that voltage. This direct current signal is amplified by amplifier 40 and applied to recorder motor 41 of recorder 42. The recorder motor 41 drives shaft 43, to which is rigidly attached contact 44 such that contact 44 moves on slide wire 45 to supply a nulling current to the subsurface instrument. Voltage is developed on slide wire 45 by power supply 46. Shaft 43 also moves pen 47 which indicates on recorder chart 48 the position of contact 44 and hence the nulling current. Recorder chart 48 is driven through transmission 49 by measuring reel 50 over which cable 13 is drawn so that recorder chart 48 moves in correlation with depth as instrument 12 traverses the well.

The nulling current is fed back down the cable 13 through variable resistor 51 which may be varied to adjust the scale factor of the recorder. This nulling current develops a direct current voltage across resistor 24 which opposes the voltage across resistor 21. Motor 41 adjusts contact 44 so that the voltages across resistors 24 and 21 are equal. With no voltage across vibrating condenser 23, no signal from amplifier 28 is sent up the cable. This is the null point and the surface equipment automatically adjusts itself to maintain this null point when incident radiation varies. On recorder chart 48 is recorded the position of the contact 44 and hence the nulling current necessary to develop a voltage across resistor 24 equal to the voltage across resistor 21. This current is proportional to the incident radiation, and the record made on the recorder chart is thus a record of the incident radiation as the subsurface instrument 12 is caused to traverse the well.

Thus far, the conventional radioactivity well logging system has been described. The instant invention comprises an improvement whereby absolute values of radiation may be measured. Switch 52 is provided to remove signals from the surface apparatus and to apply a relatively high direct current from direct current power supply 53 to cable 13. The current sent down the cable from direct current power supply 53 is sufficient to energize relay 54 whereas the normal nulling current is insufficient to energize this relay. Relay 54 is a ganged relay of the latching type; thus a direct current pulse from direct current power supply 53 causes the relay to change position and there remain in the absence of pulses from power supply 53 until another pulse is sent down the cable from power supply 53, at which time the relay returns to its former position. This is necessary since the surface logging equipment must be connected to the cable both for logging and for the zero determining operation and since the direct current power supply 53 must be disconnected to determine the zero point. Power supply 53 is utilized only to change position of down hole relay 54. During the zeroing operation, relay 54 is in the position which removes battery 20 from the chamber circuit and applies a zeroing voltage derived from the circuit consisting of battery 55 in series with resistors 56 and 57.

As explained above, the point of zero radiation on recorder chart 48 is not equivalent to the point where there is no nulling current being sent down the cable, for contact difference of potential between the plates of the vibrating condenser causes a signal with no ionization current. Neither is it equivalent to the point where there is no voltage applied between electrodes 18 and 19, because the contact difference of potential between the two electrodes results in the collection of ions produced by incident radiation in chamber 17. Since this contact difference of potential depends upon the electrode composition, and surface conditions, and since the surface cannot be perfectly clean, it varies from chamber to chamber. Thus, the voltage required to be applied between electrodes 18 and 19 to off-set this contact difference of potential must be determined experimentally for each chamber. Before the subsurface instrument is assembled in its housing, a potentiometer is placed in the chamber circuit to provide a variable D.-C. potential between plates 18 and 19. This potentiometer is varied until a voltage is reached for which there is no change in the voltage across resistor 21 when a source of radiation is brought near the chamber. Bringing the source of radiation nearer the chamber, produces more ionization in the chamber; this increases the ionization current and, hence, the voltage across recorder 21 except for the case when the net voltage between the chamber electrodes is zero, since then no ions are collected no matter how many may be present. The potential thus determined is made available in the subsurface instruments by battery 55 and resistors 56 and 57. The contact difference of potential is ordinarily near 0.5 volt thus battery 55 may be a 1.5 volt battery. Resistors 56 and 57 are proportioned so that the voltage across resistor 57 is the experimentally determined voltage necessary to make the net voltage between chamber electrodes zero.

To make absolute measurements of radiation it is necessary to determine the point of zero radiation on recorder chart 48. Assuming the instruments are initially in logging operation, direct current power supply 53 is momentarily switched onto cable 13 thus energizing relay 54 and applying the potential across resistor 57 to the chamber electrodes. Switch 52 is then returned to its original position. The pen 47 then registers the point of zero radiation upon recorder chart 48. Direct current power supply 53 is then again switched momentarily onto cable 13 and latching relay 54 returns to its initial position applying the voltage of battery 20 to the chamber electrodes. Switch 52 is again returned to its operating position and the apparatus may be used for logging with a known point of zero radiation. Comparison of the then observed pen position with the previously determined pen position corresponding to zero radiation provides an absolute measure of radiation intensity.

In Figure 3 there is illustrated an alternative form of the invention, wherein the position of zero radiation is determined by grounding the central electrode of the ionization chamber and, hence, short circuiting the ionization current. Since none of the ionization current then passes through resistor 21, this is equivalent to zero ionizing radiation as far as the vibrating condenser and the rest of the circuit is concerned, although the input impedance to the vibrating condenser is changed. It is necessary that the input circuit to the vibrating condenser be grounded on the chamber side of resistor 22 lest resistor 21 be short circuited, rendering the feed-back circuit inoperative and leaving no stable point of zero radiation on recorder chart 48. It is necessary to employ a latching relay in order that the surface equipment can be in recording condition during the zero determination, however, a latching relay cannot be employed at the central electrode of the chamber lest there be excessive leakage resistance at the central electrode since latching relays of high insulation and small size are unavailable. Hence, a latching relay is used to operate another relay at the central electrode. As in the system of Figure 2 the momentary application of current from direct current power supply 53 to the cable, energizes latching relay 54 which closes a circuit comprising battery 58 and relay 59. Relay 59 is preferably of special construction. A conventional relay comprises a fixed contact and a contact moved by energization of the relay coil. These contacts are conventionally separated by solid insulation when the circuit is open. Relay 59 is constructed so that another leakage path between electrode 18 and ground is not offered by solid insulation in the relay mounting for resistor 21 is of the order of 100,000 megohms and would be short-circuited by such leakage. Relay 59 is therefore constructed so that there is no added insulation and, hence, no additional leakage path between the fixed contact 60 and movable contact 61. This is accomplished by mounting contact 60 on the lead to electrode 18 and mounting relay 59 with movable contact 61 on the grounded instrument housing. Only air insulation is between the open contacts except for the solid insulation already needed to separate the central electrode from ground. The closing of relay 54 causes the current from battery 58 to close relay 59 which grounds the central electrode of chamber 17. As in the system of Figure 2, the pen 47 will record the point of zero radiation on recorder chart 48 when the switch 52 is returned to the recording position. Another momentary application of direct current power supply 53 to cable 13 energizes latching relay 54 which thereupon moves to its open position, thus de-energizing relay 59 and the system is returned to logging condition.

It is to be understood that this invention is not to be limited to the specific modifications described but is to be limited only by the following claims:

I claim:

1. A method of radioactivity well logging that comprises traversing the formations penetrated by a well with a continuous current radiation detector having an output resistor, temporarily producing a condition of approximately zero detector current in said output resistor, and measuring the current in said output resistor relative to said condition of zero current whereby absolute values of radiation from said formations are indicated.

2. A method of radioactivity well logging that comprises traversing the formations penetrated by a well with a continuous current radiation detector, temporarily applying such voltage to said detector that there is approximately zero net electric field collecting ions within said detector thereby temporarily producing a condition of approximately zero current output from said detector, and measuring the current from said detector relative to said condition of zero current whereby absolute values of radiation from said formations are indicated.

3. A method of radioactivity well logging that comprises traversing the formations penetrated by a well with a continuous current radiation detector having an output resistor, temporarily short-circuiting the detector output thereby temporarily producing a condition of no detector current in said output resistor, and measuring the current in said output resistor relative to the condition of no detector current whereby absolute values of radiation from said formations are indicated.

4. In a method of radioactivity well logging that comprises traversing the formations penetrated by a well with a continuous current radiation detector, measuring the voltage developed across an output resistor by the continuous current from said detector, transmitting said measurements to the surface of the earth, and there recording said measurements as indicative of radiation from said formations, a method for rendering said measurements absolute that comprises from the surface of the earth switching off the output current in said output resistor from said radiation detector, recording the measurement of this condition as the condition of zero radiation, and from the surface of the earth switching on the output current in said output resistor from said radiation detector.

5. In a method of radioactivity well logging that comprises traversing the formations penetrated by a well with a continuous current radiation detector, measuring the voltage developed across an output resistor by the continuous current from said detector, transmitting said measurements to the surface of the earth, and there recording said measurements as indicative of radiation from said formations, a method for rendering said measurements absolute that comprises from the surface of the earth short-circuiting the output of said radiation detector thereby producing a condition of no detector current in said output resistor, recording the measurement of this condition as the condition of zero radiation, and from the surface returning said radiation detector to logging condition.

6. In a method of radioactivity well logging that comprises traversing the formations penetrated by a well with a continuous current radiation detector, measuring the current from said detector, transmitting said measurements to the surface of the earth, and there recording said measurements as indicative of radiation from said formations, a method for rendering said measurements absolute that comprises from the surface of the earth connecting a voltage source between the electrodes of said radiation detector which approximately nullifies the contact difference of potential between said electrodes, recording the measurement of this condition as the condition of zero radiation, and from the surface of the earth returning said radiation detector to logging condition.

7. In a radioactivity well logging system comprising a subsurface instrument housing, a continuous current radiation detector having an output resistor disposed within said instrument, means for causing said detector to traverse the formations surrounding a borehole whereby radiations from said formations are detected by said detector, means for measuring the current in said output resistor as an indication of the radiation from said formations, means for transmitting said measurements to the surface of the earth, and means on the surface for indicating said measurements in correlation with the depth in the borehole at which detection occurred, the improvement which permits indication of absolute values of radiation, said improvement comprising signalling means at the surface of the earth, means for transmitting signals from said signalling means to the subsurface instrument, switching means in said subsurface instrument responsive to said signals, means responsive to said switching means for reducing the detector current in said output resistor to zero, and means responsive to said switching means for putting said detector in logging condition.

8. In a radioactivity well logging system comprising a subsurface instrument housing, a continuous current radiation detector disposed within said instrument, means for causing said detector to traverse the formations surrounding a borehole whereby radiations from said formations are detected by said detector, means for measuring the current in said detector as an indication of the radiation from said formations, means for transmitting said measurements to the surface of the earth, and means on the surface for indicating said measurements in correlation with the depth in the borehole at which detection occurred, the improvement which permits indication of absolute values of radiation, said improvement comprising pulsing means at the surface of the earth for producing current pulses, means for transmitting said pulses to the subsurface instrument, a latching relay in said subsurface instrument that is adapted to change position with each of said pulses and remain in position until the arrival of a subsequent pulse, a source of direct current having a potential equal to the contact difference of potential between the electrodes of said detector, means including said latching relay for applying said source between said electrodes to nullify said contact difference of potential following a current pulse from said pulsing means, and means including said latching relay for applying operating voltage between said electrodes following a subsequent current pulse.

9. In a radioactivity well logging system comprising a subsurface instrument housing, a continuous current radiation detector disposed within said instrument, mean for causing said detector to traverse the formations surrounding a borehole whereby radiations from said formations are detected by said detector, means for measuring the current in said detector as an indication of the radiation from said formations, means for transmitting said measurements to the surface of the earth, and means on the surface for indicating said measurements in correlation with the depth in the borehole at which detection occurred, the improvement which permits indication of absolute values of radiation, said improvement comprising pulsing means at the surface of the earth for producing current pulses, means for transmitting said pulses to the subsurface instrument, a latching relay in said subsurface instrument that is adapted to change position with each of said pulses and remain in position until the arrival of a subsequent pulse, means including said latching relay for short-circuiting the output current of said detector following a current pulse from said pulsing means, and means including said latching relay for returning said detector output to logging condition following a subsequent current pulse.

10. In a radioactivity well logging system comprising a subsurface instrument housing, a continuous current radiation detector disposed within said instrument, means for causing said detector to traverse the formations surrounding a borehole whereby radiations from said formations are detected by said detector, means for measuring the current in said detector as an indication of the radiation from said formations, means for transmitting said measurements to the surface of the earth, and means on the surface for indicating said measurements in correlation with the depth in the borehole at which detection occurred, the imporvement which permits indication of absolute values of radiation, said improvement comprising pulsing means at the surface of the earth for producing current pulses, means for transmitting said pulses to the subsurface instrument, a latching relay in said subsurface instrument that is adapted to change position following each of said pulses and remain in position until the arrival of a subsequent pulse, an arm mounted on one side of the output circuit of said detector and movable to contact the other side of said output circuit, a solenoid adapted to move said arm, a voltage source, means including said latching relay for connecting said voltage source to said solenoid following a current pulse from said pulsing means, and means including said latching relay for disconnecting said voltage source from said solenoid following a subsequent current pulse.

References Cited in the file of this patent

UNITED STATES PATENTS

| | | |
|---|---|---|
| 2,219,274 | Scherbatskoy | Oct. 22, 1940 |
| 2,488,491 | Davis | Nov. 15, 1949 |
| 2,618,751 | Fearnside et al. | Nov. 18, 1952 |
| 2,721,945 | Sell et al. | Oct. 25, 1955 |